Nov. 18, 1969  T. G. BOGLE  3,478,576
ACOUSTIC LEAK DETECTING APPARATUS AND METHOD
Filed Aug. 18, 1967  2 Sheets-Sheet 1
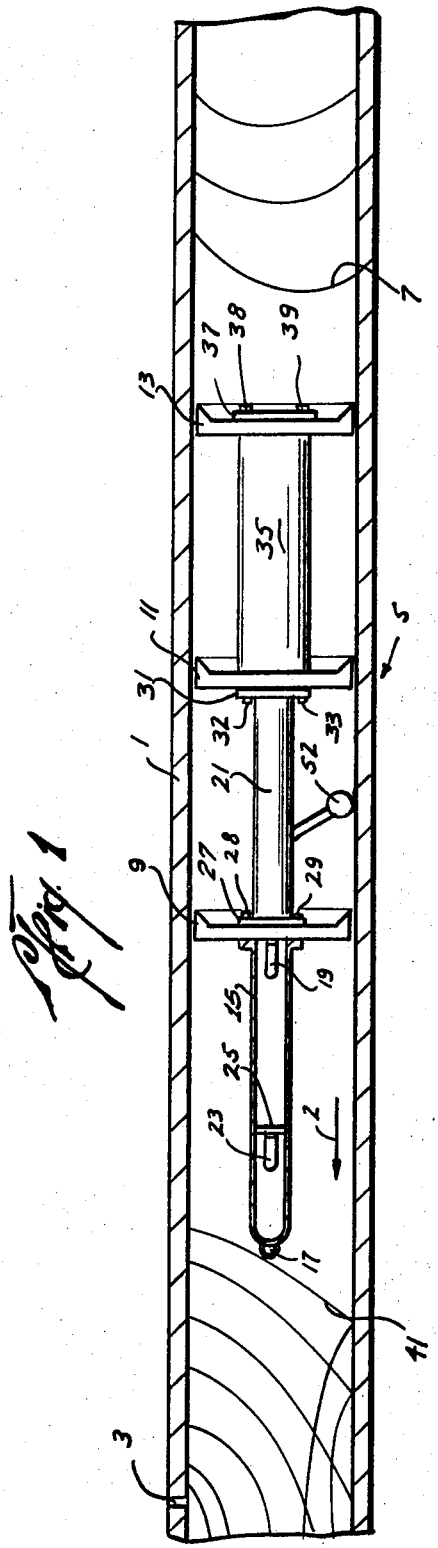
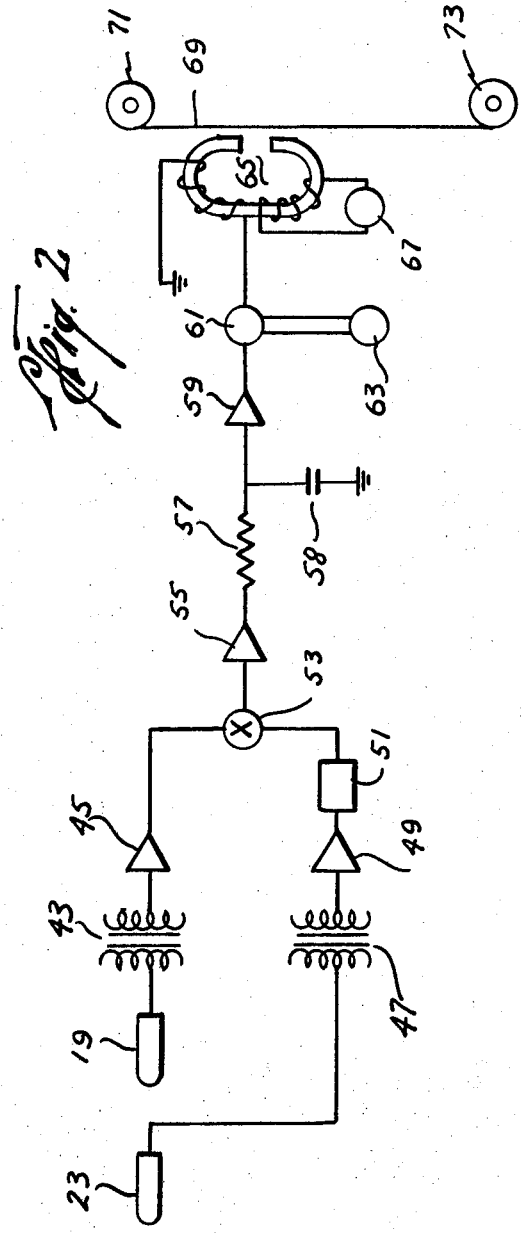
Tommy G. Bogle
INVENTOR
BY Arnold, Roylance,
Kruger & Durkee
ATTORNEYS

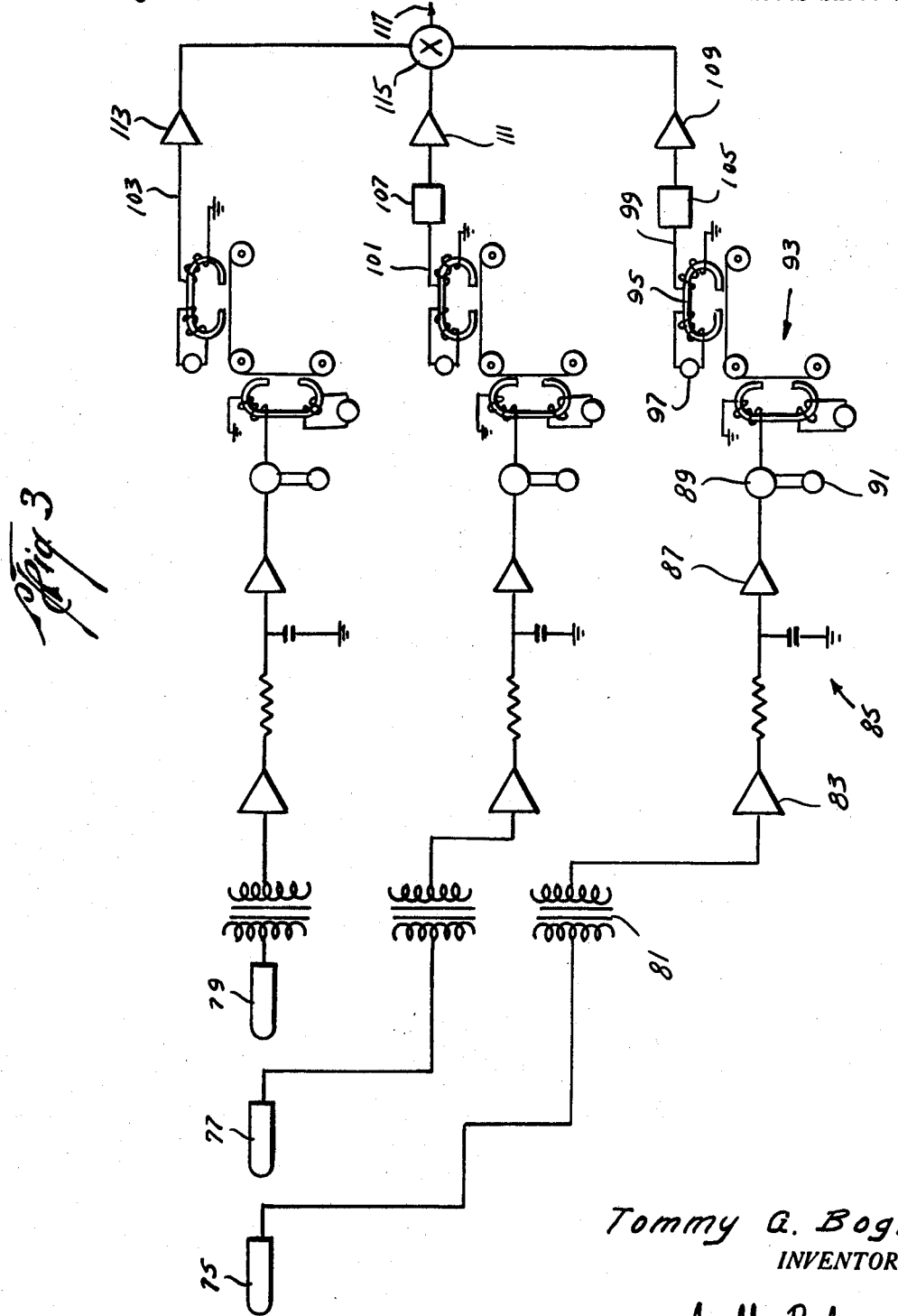

United States Patent Office 3,478,576
Patented Nov. 18, 1969

3,478,576
ACOUSTIC LEAK DETECTING APPARATUS
AND METHOD
Tommy G. Bogle, Houston, Tex., assignor to American Machine & Foundry Company, New York, N.Y., a corporation of New Jersey
Filed Aug. 18, 1967, Ser. No. 661,566
Int. Cl. G01m 3/04
U.S. Cl. 73—40.5      16 Claims

ABSTRACT OF THE DISCLOSURE

This invention pertains to unique apparatus for passing through a pressurized pipeline and acoustically detecting leaks therein by a unique method. Basically, the apparatus includes a pipeline pig having at least one cup isolating the front end of the pig from the back end, two acoustic transducers fixedly spaced apart (the downstream one receiving point-source noise from a leak earlier than the other), delaying means for synchronizing the signal developed from the downstream transducer with the signal developed from the other transducer and combining means, such as a cross correlator, for producing an output that accentuates leak noise and relatively diminishes non-point source and upstream noises. The delaying means may be one or more recorders and playback and combining or correlation may be accomplished either inside the pig or later outside the pig.

---

This invention relates to apparatus for detecting leaks in pipelines having fluid flowing therethrough and more particularly to pig-mounted apparatus that passes through a fluid-carrying pipeline, the fluid therein being under pressure, and detects by acoustical techniques the presence of leaks in a manner that distinguishes point-source noises accompanying leaks in the pipeline from other noises that might be present.

"Fluid" as used herein refers to fluid in either a liquid or gaseous state.

Commonly fluids, and especially gas, that flow through transmission and distribution pipelines escape from such lines at an appreciable loss in quantity and, hence, often in loss of thousands of dollars in revenue merely because such escaping or leaking goes undetected. Moreover, in many instances the leaking of gas lines is also extremely hazardous, the accumulation of gas under sidewalks, streets, foundations and in sewers, basements and other enclosed areas resulting in explosions that have resulted in very expensive property damage and even loss of life.

Various techniques and apparatus have been developed to detect leaks, and so important is it to do everything possible in order to minimize the leaks that go undetected that it is not uncommon to use a combination of the developed prior art schemes on the same pipeline in hopes that is one system fails to detect a given leak, perhaps another system will be successful. Among the schemes that are in use and which have proven to be successful to some degree are electronic "sniffers" that detect the presence of methane or other gaseous substances (injected into the pipeline especially for this purpose) that emit a detectable odor even in trace amounts. Such schemes work reliably only in enclosed areas. Further, to be highly reliable, a large number of these somewhat expensive electronic "sniffers" are required.

Another scheme employed with some degree of success in detecting leaks in cross-country pipelines is the use of aerial surveys to detect dead vegetation. The several shortcomings to this scheme are the expense involved, the unreliability in the absence of vegetation (such as when a pipeline goes underneath a roadbed—where pipeline leaks often occur), the delay in detection while the vegetation is dying, and the likelihood that small leaks may not cause vegetation to be noticeably affected at all.

Also, instrumented pipeline pigs have been employed utilizing a number of schemes. One scheme that is known in the prior art is the attempted detection of pressure drops in the vicinity of leaks by isolating a compartment or chamber within the pig as it moves through a line and comparing the difference in pressure within the compartment with the pressure without. The inability to successfully isolate a compartment in the presence of irregular surfaces and projections (sometimes known as "icicles") at the junctions of pipeline joints, etc., makes such schemes unreliable. Also, the rapid movement of the pig through the line often does not allow a measurable pressure difference to develop at a relatively small leak in the time that it takes the pig to pass there opposite.

Temperature-sensitive devices have also been attempted to exploit the phenomena that there is normally a change of temperature in the area of a leak caused by the rapid expansion of the fluid under pressure as it escapes through the pipeline breach. Again, as with the pipeline pressure detecting devices, the inability to achieve effective isolation of a compartment within the pig and the speed of the pig moving past a small leak make temperature-sensing devices only partly reliable.

A very promising phenomenon which has been attempted to be exploited to some extent, but heretofore without a high degree of reliable success, is the detection of the noise that occurs as the fluid under pressure escapes through a leak. Although it has been long known that fluid leaking under pressure produces sound waves in the pipeline fluid which manifest themselves as noise, instrumented pigs using acoustic transducers for detecting this noise have not been highly successful for a number of reasons.

With respect to the environmental noise outside of the pipeline as compared to the noise associated with a leak, the environmental noise is often so large that the meaningful leak-associated noise cannot be distinguished from that which has no meaning. This trouble is particularly noticeable at railroad crossings, highway crossings, in the vicinity of blasting and other frequent large noise occurrences, and near airplane traffic routes. These interfering noises often saturate the detectors and amplifiers so that any noise in addition to the environmental noise has no effect whatsoever. It is often that the source that produces the background noise and prevents detection of leak noise is also the possible producer of ground shocks and ground swells that result in pipeline breaks.

Another problem with most prior art acoustical detectors is their inability to distinguish leak-associated noise from other noises transmitted within the pipeline fluid created by sources other than leaks. These extraneous noises which cause ambiguities to result in the prior art detector are such noises as the acoustical pulsations imparted to the fluid by the compressor or pump causing the fluid to flow, as the slapping of the resilient cups of the pig as they pass over welds, joints and other internal projections or "icicles" in the pipeline, and as caused by gas or fluid leaking through and around the cups of the pig during translation through the pipeline.

In summary, although acoustical detectors mounted on pipeline pigs have been employed and recordings have been produced from these detectors, none of the prior art acoustical detectors so-mounted has found commercial favor because of the highly unreliable nature of the traces that are developed, which have doubtful meaning as to what they show and as to what they fail to show.

Therefore, what is described herein generally is an improved acoustical leak detector for discovering breaches or leaks in a pipeline having fluids flowing therein under pressure which takes advantage of the acoustics phenomenon accompanying a pipeline leak, but which ingeniously overcomes the shortcomings of all of the known devices to effectively eliminate the effects of other noise. Generally the described method comprises propelling a first and second acoustical transducer through the pipeline, each transducer generating a signal in response to a common leak noise, delaying the output from the first transducer to receive the noise so that the signal produced therefrom is substantially synchronized in time with the noise from the second-to-receive transducer, and combining these two outputs in such a manner that the noise from a point source is accentuated and noise from non-point sources is diminished. Also, shielding of upstream noises from downstream noises may be accomplished such as by the propelling cups on the pigs or otherwise so that point source noises which are upstream (typically such as from a pump station) are not detected by the downstream-placed transducers.

Generally, the described apparatus comprises a translating device in pig form, the cups providing shielding of the upstream noise from the downstream portion of the pig, a first transducer secured on the downstream side, a second transducer fixedly spaced from the first further downstream, delaying means connected to the second transducer which delays its output so that it is substantially synchronized in time with the first output, and combining means (typically in the form of a cross correlator) which produces an accentuated signal for a noise accompanying a downstream pipeline leak and diminishes noise from upstream and from non-point sources even downstream.

One typical way of achieving the delay function is through a magnetic or other recording scheme, such scheme permitting the delaying of some responses from others during playback so that the eventually produced combined output signal is meaningfully synchronized.

As a result of the combined structural and functional operation of the apparatus of the invention described and claimed herein, more reliable and meaningful indications of leaks in fluid-carrying pipelines through acoustical detection are made than ever before achieved.

So that the manner in which the advantages of the invention are attained can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the drawings:

FIG. 1 is a cross-sectional view of an illustrated mechanical apparatus utilizing the invention.

FIG. 2 is an electrical block diagram of a first preferred electrical portion of the embodiment shown in FIG. 1.

FIG. 3 is an electrical block diagram of a second preferred electrical portion of the embodiment shown in FIG. 1.

Now referring to the drawings, and first to FIG. 1, a portion of a typical pipeline 1 contatining fluid, typically gas under pressure, is shown. For purposes of illustration, it may be assumed that the fluid is flowing in direction 2 from right to left in the illustration. A breach or leak 3 to be detected exists in the pipewall downstream from the location of an instrumented pig 5. It should be noted that upstream from pig 5 pulsating longitudinally traveling pulsations 7 are occurring as typically produced by a compressor pump which causes the fluid to flow. The instrumented pig is supported and centralized within the internal region of the pipeline by transverse resilient cups 9, 11 and 13, each of which is shaped to support the pig within the approximate center of the pipe and to entrap the flowing fluid, thereby propelling the pig from right to left along with the flowing fluid.

Secured at the upstream side of the forward resilient cup 9 is a protection cage 15, which allows fluid to circulate freely therewithin but which protects any items disposedly located within the cage from being damaged by solid articles within and projections from the pipeline that would otherwise come in contact against these items. Because, however, the cage permits the free passage of fluid, any item located within the cage is still subjected to the environmental conditions existing within the pipeline. The cage also provides a convenient structure in which a lift eye 17 may be formed.

Located within cage 15 is a first microphone, hydrophone or other acoustic transducer 19 capable of responding to or detecting acoustic energy over a wide band or range of frequencies. Acoustic transducer 19 is electrically connected by wire or other conductor through resilient cup 9 to an instrument package 21 located therebehind.

At a fixed location downstream from transducer 19 is is a second transducer 23 having substantially the same response characteristics as transducer 19. Transducer 23 is supported by cross-piece 25 within the cage. The connectors to this transducer may conveniently extend within the structural members of the cage, eventually terminating within instrument package 21, as with the lead from transducer 19.

Instrument package 21 located behind cup 9 not only provides a convenient location for at least some of the electronic packaging existing within the pig, but also provides a longitudinal spatial separation or noise isolation-compartment between cups 9 and 11. Conveniently, package 21 may be secured by a retainer ring 27 and bolts 28 and 29 to cup 9, in conventional manner. Bolts 28 and 29 at the same time may be conveniently used to secure support legs of cage 15 on the downstream side of cup 9. At the rearward side of package 21, the package is secured to cup 11 by retainer ring 31 and bolts 32 and 33, again in conventional manner.

Recording instruments that are included within the instrumented pig may conveniently be located in a second convenient electronic package 35 disposed between cups 11 and 13. Bolts 32 and 33 may be used to secure the package 35 to cup 11 by being inserted through cup 11. At the upstream side of cup 13, retainer ring 37 and bolts 38 and 39 may be used to attach package 35 to cup 13.

It should be noted that fluid leaking at leak hole 3, which is in actuality esentially a point source of noise, will result in acoustic energy waves emanating therefrom. Since hole 3 is downstream from the instrumented pig 5, the practical effect of the emanating wavefront 41 is that it is essentially traveling longitudinally when it first encounters transducers 23 and later transducer 19. That is, although the wave at the time of origin sets up a wavefront which bounces back and forth transversely within the pipe in the near vicinity of hole 3, the waves that travel longitudinally within the fluid carried by the pipe successively longitudinally encounter transducer 23 and transducer 19.

For purposes of discussion of the operation of the entire apparatus, it should be noted that transducers 19 and 23 have essentially the same detection characteristics, transducer 23 being located at a fixed distance downstream from transducer 19. Also, it should be noted that the cups 9, 11 and 13 substantially transversely span the internal diameter of pipe 1 to effectively shield transducers 19 and 23 from noise originating upstream and resulting in wavefront 7. For that matter, even self-generated pig noise resulting from the pig traveling through the line is shielded somewhat by the cups and the isolation compartments therebetween.

FIG. 2 illustrates a preferred electrical embodiment which may be jointly housed within the electrical compartments or packages 21 and 35. For purposes of discussion, it may be assumed that the entire electrical circuit is housed in forward compartment 21 and that the rearward compartment 35 is used to house the necessary batteries or power supply circuit necessary to power the electronics and the recording instruments. Electrical connections are made through leakproof electrical connectors joining compartment 21 with compartment 35 and passing through resilient cup 11.

Transducers 23 and 19 are typically wide band signal detectors, typically sensitive to the range of frequencies from 5 to 50,000 Hertz, the frequency response for purposes of discussion assumedly flat. The output from transducer 19 is connected to a typical impedance matching transformer 43, the secondary of which is connected to a pass band amplifier 45. Amplifier 45 may be made sensitive over a relatively narrow range of frequencies so that considering such things as the fluid which is carried in the pipe, the pipe diameter, the wall thickness of the pipe, and the diameter of the hole, the amplifier and related components may be selected to be most sensitive to the leak noise which accompanies a breach in the pipe under these conditions. Other noises which may be at other frequencies are then somewhat minimized with respect to the noise which accompanies the leak. For example, low frequency interfering noises are predominantly in the range of 200 Hertz or lower. On the other hand, a typical gas methane (a typical fluid) has a sound velocity of 430 meters per second at one atmosphere and only a few percent higher velocity at 50 atmospheres. The frequency of one of the noises accompanying a leak is that noise related to the diameter resonance of the pipe. This escaping sound is inversely proportional to twice the pipe diameter. Therefore, the frequency of this noise caused by methane escaping through a pipeline leak is equal to 430 meters per second divided by .5 meter (for a pipe having an internal diameter of on the order of 10"). This would mean that the frequency would be 860 Hertz, which is readily filterable from the 200 Hertz frequency of the common type of interference signals. Therefore, since the approximate frequency of the sound accompanying the leaking gas is calculable, a band pass filter, as well as a selectively responsive amplifier for passing the frequencies within this expected band of frequencies, may be inserted to increase the sensitivity of the overall instrument.

A similar calculation is possible for determining the frequence of wall thickness resonance noise.

Although not shown in FIG. 2, it may also be desirable to include within the electronic sequence of circuits a video amplifier for amplifying the entire wide range of frequencies detected to a high level provided the receiving transducer (19 or 23) is not sufficiently sensitive in and by itself.

In similar manner to what has been described above, transformer 47 is connected as the input, impedance-matching transformer to the signal received from transducer 23. The output from transformer 47 is connected to amplifier 49, which has the same characteristics essentially as amplifier 45.

Because there is a fixed longitudinal spatial relationship between transducer 19 and transducer 23 as they are mounted on the pig, there is a fixed amount of delay involved between the receipt of a particular wavefront by transducer 23 and the receipt of that same wavefront by transducer 19, assuming that the fluid flowing within pipe 1 and pig 5 moving through pipe 1 are substantially constant. Therefore, the output of amplifier 49 is applied to a delay circuit 51, which delays the signal from amplifier 49 by an amount such that the output therefrom will correspond exactly in time with the output from amplifier 45. This delay circuit may be a conventional LC delay circuit, a recorded delay circuit or any other convention means of effecting the necessary delay.

These two outputs, the output from amplifier 45 and the output from delay circuit 51, are applied to a cross correlator network 53, or other combining network. Typical cross correlator circuits are shown in FIGS. 6 and 7 of Patent 3,295,362.

The effect of combining the outputs of amplifier 45 and delay circuit 51 in such a manner is to build up or accentuate noises received from a point source by transducers 19 and 23 and subordinate, suppress or diminish noise from non-point sources. That is, if there is a general area noise somewhere upstream or downstream along the line, such as from an explosion, the noise, although of fairly good size, would not be accentuated and built up in the electronic circuit just described as would a noise from a single point source, which is typical of leak noise.

Although only two channels of related circuits connected to two transducers have been described, it is apparent that a plurality of transducers fixedly spaced at successive horizontal locations could be combined in cross correlator 53, thereby giving an even more effective accentuated signal for point source noise as opposed to noise which does not emanate from a point source downstream.

The output from correlator 53 is applied to a DC amplifier 55 and then an integrator circuit comprised of resistor 57 and capacitor 58 connected to a common or grounded connection. The integrated output is then again amplified in amplifier 59 in preparation for being recorded as explained below.

A gate or modulator circuit 61 receives the output from amplifier 59 and from a free-running multivibrator or oscillator circuit 63 connected thereto. The resulting chopped or modulated signal is suitable for application to a recording head magnet 65 which is biased to achieve optimum linearity in conventional manner by oscillator 67. The resulting output then is suitably transposed to a recordin gtape 69 where it becomes a permanent record of the leak conditions in the pipe and which may be played back later for purposes of examination. The tape during recording is driven by rollers 71 and 73, which are part of a recording mechanism not shown.

It has been assumed in FIG. 2 that the speed of the pig and the fluid flowing within the line are each constant, and therefore the delay which is inserted by circuit 51 can be preset to a constant value. It is possible to include a speed monitoring device as part of the mechanical arrangement of the pig shown in FIG. 1. For example, a roller 52 attached to pig 5 may contact the inside surface of pipe 1 and in tachometer-style generate a voltage which may then be used to change the delay characteristics of circuit 51 automatically in accordance with the varying speed conditions of the fluid and pig within pipe 1. When the speed of the pig becomes faster than a nominal value, then the delay time becomes shorter.

An alternate embodiment to that shown in FIG. 2 is shown in FIG. 3, where three transducers similar to transducers 19 and 23 are shown. Successively these transducers 75, 77 and 79 are fixedly spaced apart from one another within a cage similar to that shown for 15 in FIG. 1. Each electronic channel or series of circuits connected to one of the transducers is similar to the others. In sequence, the output from transducer 75 is applied to transformer 81, the output of which is applied to amplifier 83, the output of which is applied to integrator 85, the output of which is applied to amplifier 87, the output of which is applied to gate circuit or modulator 89 driven by free-running multivibrator or oscillator 91, the output of which is applied to recording mechanism 93. All of the individual components are similar to those corresponding components which are described above for the FIG. 2 embodiment.

To combine or correlate the three separate recordings made by each hydrophone or other acoustic transducer means 75, 77 and 79 in a meaningful manner, it is necessary to delay the signals developed from that received by transducers 75 and 77 with respect to the signal developed from that received by transducer 79 so that the same wavefront occurrence is synchronized in time during playback. Means for accomplishing this synchronization may be mounted within the pig to result in a single output which itself may be recorded, or separate recordings may be made which may later be played back at a location other than within the pig itself. The circuits, however, regardless of the scheme which is selected, are similar in nature as will be described below.

Although the term playback usually implies the subsequent playing of a recording (after such recording has previously completely been made) so that the recording can be at a much later date audibly or visually heard or displayed, herein "playback" and related terminology refers not only to this conventional meaning but also refers to any subsequent detection or pickup of that which has been recorded even if such occurs immediately following the recording act or while recording on the recording means at the same time just ahead of the playback occurrence.

A magnetic pickup head 95, biased by oscillator 97 in conventional manner, is disposed adjacent the tape to develop a signal during playback, this signal being produced on line 99. Also, a signal 103 is produced which is associated with the signal received by transducer 79. Signal 99, being the first signal to be produced in time from a common wavefront, is delayed in circuit 105 by an amount which would make the output therefrom correspond in time with the signal on line 103. Similarly, delay circuit 107 delays the signal on line 101 by a slightly lesser amount so that its output is likewise synchronized in time with the signal on line 103.

After amplification in amplifiers 109, 111 and 113, respectively, the outputs are applied to a cross correlator circuit 115, which produces a common or combined output, accentuating leak or point-source noise in the manner similar to that for the circuit described in FIG. 2 and diminishing or minimizing even large noises which do not result from a point source or which are produced from a source upstream (upstream noise being shielded from the transducers by the cups 9, 11 and 13, as previously described).

Alternately, delay circuits 105 and 107 may be removed and the time of playback for the recording mechanism associated with transducer channels 75 and 77 may be adjusted so that the resulting times of occurrence which are detected by the respective pickup means are all synchronized, effectively as described above with the individual delay circuits.

In any event, an output 117 is produced from cross correlator 115 which may be examined for the presence of leak-produced noise. If desired, this output may conveniently be amplified and/or integrated or otherwise treated to produce an output which has optimum characteristics for examination. Also if desired, the output may be converted to a visual recording form (such as on a strip chart or film).

Although three transducer channels are shown and described in the FIG. 3 embodiment, only two transducers may be used in a manner similar to that described for FIG. 2, and more than three transducers may be used, each having its individual associated channel. Also, although a tape mechanism has been used as a recording means for each of the respective channels and a separate recording means has been used for each, it is also true that wire, drum, and other type recorders may be used with equal facility. The pickup head or the tracking means for translating the recorded signals into a signal which is adjusted by some delay circuit means must be compatible with the recording means which is used, but otherwise various alternate structures well known in the art are acceptable.

If the playback is done within the instrumented pig itself, rather than being stored for a later playback after all the recording has been achieved and the pig has been run through the line to be inspected, a continuous tape or drum recording instrument may be employed. This is possible because there is no need to retain the individual signal measurements after the combined or correlated signal has been produced.

Also, although signals in all channels may be recorded for later playback, when the combining means is located within the pig, it may be desirable not to record the signal in the channel of the transducer last to receive it and only delay or record and play back at a later time signals in the other channels to achieve the desired combining effect, as previously discussed.

Although conventional amplifiers have been suggested for the amplifiers shown in the respective block diagrams, logarithmic gain amplifiers may be used to develop the signals received from the transducers. Such an amplifier may be merely a standard Class A amplifier with a logarithmic response voltage divider used as an interstage coupling, such as shown on p. 671 of "Waveforms," Radiation Lab Series 19, McGraw-Hill.

It also may be desirable to use some means to filter out low frequency interference noises, in addition to the noise depression which the above system automatically achieves.

It should also be noted that in addition to the downstream pulsating noises that occur or are produced by a pulsating compressor or a pump moving the fluid within the line, the slapping noises that accompany the resilient cups moving past the internal projections or "icicles" within the pipeline are also mostly located upstream and therefore do not reach the transducers for detection and electronic treatment in accordance with this invention.

Further, it should be noted that one of the big advantages of using acoustical transducers in the manner described is that the isolation compartments between the cups in which the electronic packages may be located do not have to be leak-proof or pressure tight as when other types of transducers are used. This is because an appreciable amount of shielding of one of the pig from the other is provided by cups that merely occupy most of the internal transverse area of the pipeline.

Also, the propelling or translating cups have been previously identified as performing a centralizing function (as well as other functions). Actually this function is not required in all embodiments of the invention, since separate centralizers may be used on a given instrumented pig or even no centralizers at all.

While only one physical embodiment and two electrical embodiments have been shown and described, although modifications have been discussed, it is obvious that there are other substitutes and changes of structure which may be made without varying from the scope of the invention.

What is claimed is:

1. Acoustic leak detection apparatus for being propelled internally through a pipeline in which fluid is flowing under pressure for detecting the presence of point-source noise accompanying a leak in the pipeline, comprising translating means substantially occupying the inside transverse area of the pipeline, thereby acoustically shielding the upstream side of the apparatus from the downstream side, first acoustic transducer means fixedly secured on the downstream side of the apparatus for producing a first output upon receipt of the noise accompanying a downstream pipeline leak, second acoustic transducer means fixedly secured to said apparatus a fixed longitudinal distance downstream from said first acoustic transducer means for producing a second output upon receipt of noise accompanying said leak, delaying means connected to said second acoustic transducer means for delaying said second output to thereby produce a third output that is substantially synchronized in time with said first output, and combining means receiving said first and third outputs for producing an accentuated signal for a noise accompanying a downstream pipeline leak, noise signals from upstream and from non-point sources being diminished relative to noise accompanying a downstream pipeline leak.

2. Acoustic leak detection apparatus as described in claim 1, wherein said first and second acoustic transducer means are hydrophones sensitive to the band of frequencies most likely to accompany a pipeline leak.

3. Acoustic leak detection apparatus as described in claim 1, wherein said combining means is a cross correlator.

4. Acoustic leak detection apparatus as described in claim 1, wherein said delaying means is a magnetic recorder, the playback time for which synchronizes the produced third output with said first output.

5. Acoustic leak detection apparatus as described in claim 1, wherein said delaying means is adjustable, and including speed monitoring means for adjusting said delaying means so that said first and third outputs remain synchronized in the presence of variation in propelling velocity of the apparatus.

6. Inspecting apparatus for acoustically detecting the presence of point-source noise accompanying a leak in a pipeline through which fluid is flowing under pressure, comprising an acoustic leak detection unit for being propelled internally through the pipeline, including translating means substantially occupying the inside transverse area of the pipeline, thereby acoustically shielding the upstream side of said unit from the downstream side, first acoustic transducer means fixedly secured on the downstream side of the unit for producing a first output upon receipt of noise accompanying a downstream pipeline leak, second acoustic transducer means fixedly secured to said apparatus a fixed longitudinal distance downstream from said first acoustic transducer means for producing a second output upon receipt of noise accompanying said leak, first recording means connected to said first acoustic transducer for recording said first output, and second recording means connected to said second acoustic transducer for recording said second output; and means for playing back the first and second recordings to synchronize in time said first and second outputs for producing an accentuated signal for a noise accompanying a downstream pipeline leak, noise signals from upstream and from non-point sources being diminished relative to said noise accompanying a downstream pipeline leak.

7. In acoustic leak detection apparatus for being propelled internally through a pipeline in which fluid is flowing under pressure for detecting the presence of point-source noise accompanying a leak in the pipeline, detection means comprising first acoustic transducer means fixedly secured on the downstream side of the apparatus for producing a first output upon receipt of noise accompanying a downstream pipeline leak, second acoustic transducer means fixedly secured to said apparatus a fixed longitudinal distance downstream from said first acoustic transducer means for producing a second output upon receipt of noise accompanying said leak, delaying means connected to said second acoustic transducer means for delaying said second output to thereby produce a third output that is substantially synchronized in time with said first output, and combining means receiving said first and third outputs for producing an accentuated signal for a noise accompanying a downstream pipeline leak.

8. In acoustic leak detection apparatus for being propelled internally through a pipeline in which fluid is flowing under pressure for detecting the presence of point-source noise accompanying a leak in the pipeline, detection means comprising first acoustic transducer means fixedly secured on the downstream side of the apparatus for producing a first output upon receipt of noise accompanying a downstream pipeline leak, second acoustic transducer means fixedly secured to said apparatus a fixed longitudinal distance downstream from said first acoustic transducer means for producing a second output upon receipt of noise accompanying said leak, at least one recording means for recording at least one of said first and second outputs, and means for playing back said recording to synchronize in time said first and second outputs for producing an accentuated signal for a noise accompanying a downstream pipeline leak.

9. The method of acoustically detecting the presence of point-source noise accompanying a leak in a pipeline in which fluid is flowing under pressure, which comprises propelling first and second acoustic transducers fixedly spaced apart internally through the pipeline, said second transducer being downstream from said first transducer, said first transducer producing a first output upon receipt of noise accompanying a downstream pipeline leak, said second transducer producing a second output upon receipt of noise accompanying a downstream pipeline leak, delaying said second output to produce a third output that is substantially synchronized in time with said first output, and combining said first and third outputs such that noise accompanying a downstream pipeline leak is accentuated.

10. The method described in claim 9, and including shielding said first and second transducers from upstream noises.

11. The method described in claim 9, and including adjusting the delay for said second output to compensate for variation in propelling velocity to maintain said first and third outputs synchronized.

12. The method of acoustically detecting the presence of point-source noise accompanying a leak in a pipeline in which fluid is flowing under pressure, which comprises propelling first and second acoustic transducers fixedly spaced apart internally through the pipeline, said second transducer being downstream from said first transducer, said first transducer producing a first output upon receipt of noise accompanying a downstream pipeline leak, said second transducer producing a second output upon receipt of noise accompanying a downstream pipeline leak, recording at least one of said first and second outputs, playing back said recording and combining the resulting signal with the other of said two outputs to produce a synchronized accentuated signal for noise accompanying a downstream pipeline leak.

13. The method of acoustically detecting the presence of point-source noise accompanying a leak in a pipeline in which fluid is flowing under pressure, which comprises propelling first and second acoustic transducers fixedly spaced apart internally through the pipeline, said second transducer being downstream from said first transducer, said first transducer producing a first output upon receipt of noise accompanying a downstream pipeline leak, said second transducer roducing a second output upon receipt of noise accompanying a downstream pipeline leaks, recording said first output, recording said second output, playing back said first and second recorded outputs in synchronism and combining them to produce an accentuated signal for noise accompanying a downstream pipeline leak.

14. Acoustic leak detection apparatus for being propelled internally through a pipeline in which fluid is flowing under pressure for detecting the presence of point-source noise accompanying a leak in the pipeline, comprising translating means substantially occupying the inside transverse area of the pipeline, thereby acoustically shielding the upstream side of the apparatus from the downstream side, a plurality of transducer means secured to said apparatus at successive longitudinal fixed locations on the downstream side of the apparatus, each producing an output upon sequential receipt of noise accompanying a downstream pipeline leak, delaying means connected to said plurality of transducer means for synchronizing in time the outputs from said plurality of transducer means, thereby producing a plurality of synchronized outputs, combining means receiving said plurality of synchronized outputs and producing an accentuated signal for a noise accompanying a downstream pipeline leak.

15. Acoustic leak detection apparatus as described in claim 14, wherein said combining means is a cross correlator.

16. Acoustic leak detection apparatus for being propelled internally through a pipeline in which fluid is flowing under pressure for detecting the presence of point-source noise accompanying a leak in the pipeline, comprising a plurality of transducer means secured to said apparatus at successive longitudinal fixed locations on the downstream side of the apparatus, each producing an output upon sequential receipt of noise accompanying a downstream pipeline leak, recording means connected to said plurality of transducer means for recording said outputs, means for playing back said recordings to synchronized in time and means for combining said played-back plurality of outputs for producing an accentuated signal for noise accompanying a downstream pipeline leak.

References Cited

UNITED STATES PATENTS

| | | | |
|---|---|---|---|
| 2,840,308 | 6/1958 | Van Horne | 235—181 |
| 2,872,996 | 2/1959 | Runge | 235—181 XR |
| 2,884,624 | 4/1959 | Dean et al. | 73—405 XR |
| 2,897,351 | 7/1959 | Melton. | |
| 2,927,656 | 3/1960 | Feagin et al. | 73—181 XR |
| 2,989,726 | 6/1961 | Crawford et al. | |
| 3,081,457 | 3/1963 | Toro | 235—181 XR |
| 3,168,824 | 2/1965 | Florer et al. | 73—40.5 |
| 3,363,450 | 1/1968 | Simpkins et al. | 73—40.5 |

LOUIS R. PRINCE, Primary Examiner

JEFFREY NOLTON, Assistant Examiner

U.S. Cl. X.R.

235—181